United States Patent Office 3,108,119
Patented Oct. 22, 1963

3,108,119
METHOD FOR PREPARING PHOSPHONO-LACTONES
Donald I. Hoke, Cleveland, Ohio, assignor to The Lubrizol Corporation, Wickliffe, Ohio, a corporation of Ohio
No Drawing. Filed Feb. 1, 1961, Ser. No. 86,303
8 Claims. (Cl. 260—343.6)

This invention relates to gamma-phosphono-gamma-lactones and to a method for preparing the same.

Gamma-phosphono-gamma-lactones are useful as insecticides, hydrocarbon oil additives, intermediates for the preparation of other useful phosphorus-containing compositions, etc. The method heretofore known for preparing the lactones involves addition of an organic phosphite to a gamma-ketocarboxylic acid in an alkaline environment to produce a metal salt of a gamma-phosphono-gamma-hydroxycarboxylic acid, conversion of the metal salt to the corresponding acid by treatment with a strong inorganic acid, and dehydration of the acid. The method has several drawbacks. A principal drawback is that the addition requires an alkaline environment which can be obtained only by the use of an inorganic metal base in amounts exceeding that required to convert the gamma-ketocarboxylic acid to the metal salt. Thereafter, however, the metal salt must be converted back to the acid and the acid is then dehydrated to form the lactone. As a result of these steps the method is costly and inefficient.

Accordingly, it is a principal object of this invention to provide an efficient method for preparing gamma-phosphono-gamma-lactones.

It is also an object of this invention to provide a process for preparing gamma-hydrocarbon-substituted-phosphono-gamma-lactones.

These and other objects are obtained in accordance with this invention by providing a process for preparing gamma-phosphono-gamma-lactones which comprises reacting an organic phosphite with an ester of a gamma-ketocarboxylic acid in the presence of a small amount of an alkaline catalyst. In most instances the reaction is exothermic and proceeds readily upon mixing of the phosphite and the ester to give the lactone and an alcohol as the by-product. The reaction may be illustrated by the following equation:

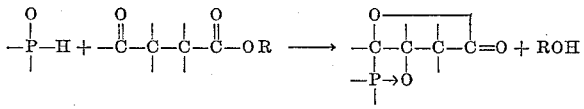

wherein R is usually a hydrocarbon radical. The lactones can be separated from the alcohol by distillation, extraction, or any such known technique.

The reaction can be carried out at any temperature below the decomposition point of the components of the reaction mixture. Ordinarily a temperature within the range from about room temperature to about 100° C. is preferred. In some instances a temperature below about 0° C. may likewise be used. Inasmuch as the reaction is exothermic external cooling may be required in order to maintain the reaction temperature within the desired range.

The relative proportion of the phosphite to the gamma-ketocarboxylic ester to be used in the reaction is not critical. While a molar ratio of 1:1 of the two reactants is usually preferred, an excess of either reactant may be used. It will be apparent from the stoichiometry of the reaction as represented by the above equation that when an excess of any one reactant is used the excess will simply remain as a diluent in the product.

Only a very small amount of an alkaline catalyst is needed to cause the formation of lactones by the above process. Such amount may be as little as 0.0001 mole or even less per mole of the phosphite or the ester used. The preferred amount is in the neighborhood of 0.001–0.01 mole per mole of either reactant. Greater amounts of the catalyst may be used but appear to offer little additional benefits.

The organic phosphites useful in the process of this invention include mono- and di-substituted phosphites in which the substituents may be alkyl, cycloalkyl, aryl, aralkyl, or alkaryl radicals. The phosphites may be obtained by any known method such as one involving the reaction of an alcohol or a phenol with phosphorus trichloride. Specific examples of the phosphites include dimethyl phosphite, diethyl phospite, dicyclohexyl phosphite, didodecyl phosphite, methyl hexyl phosphite, cyclic ethylene phosphite, cyclic 1,3-trimethylene phosphite, diphenyl phosphite, phenyl phosphite, p-butylphenyl phosphite, n-hexyl decyl phosphite, alpha-naphthyl phosphite, di-beta-naphthyl phosphite, dixenyl phosphite, dibenzyl phosphite, 2-phenylbutyl phosphite, di-(polyisobutene-(molecular weight 1000)-substituted-phenyl) phosphite, etc. For reasons of economy and their particular efficacy in the above process the dialkyl phosphites in which the alkyl radicals contain from 1 to about 30 carbon atoms are preferred.

It will be noted that since a mono-substituted phosphite is acidic, it will consume a stoichiometrically equivalent amount of the alkaline catalyst to form a metal salt. Consequently, when a mono-substituted phosphite is used in the above process, the amount of the alkaline catalyst must be sufficiently large so as to provide for both the salt formation and the catalytic action for the formation of the lactones.

The gamma-ketocarboxylic acid esters may be derived from either alcohols or phenols. The chemical constitution of the ester radical is not critical although it appears that esters derived from relatively low molecular weight alcohols, i.e., those having up to about 10 carbon atoms are more reactive with the phosphite and are therefore prefered for use in the above process. The alcohols and phenols from which the esters are derived may be exemplified by methyl alcohol, ethyl alcohol, phenol, alpha-naphthol, beta-naphthol, decyl alcohol, cyclohexyl alcohol, dodecyl alcohol, behenyl alcohol, primary-pentyl alcohol, neo-pentyl alcohol, cyclo-pentyl alcohol, benzyl alcohol, 2,4-diisopropyl phenol, ethylene glycol, glycerol, and ethyl Cellosolve.

The gamma-ketocarboxylic acid from which the esters useful in the above process are derived may be exemplified by levulinic acid, gamma-ketobutanoic acid, gamma-ketodecanoic acid, gamma-keto-alpha-chlorohexanoic acid, gamma-ketotriacontanoic acid, gamma-keto-beta-methylheptanoic acid, and gamma-keto-delta-bromo-octanoic acid. Such acids may be prepared by oxidation of the corresponding gamma-hydroxycarboxylic acids. Another method for preparing such acid involves the reaction of a mineral acid, e.g., hydrochloric acid, with furfuryl alcohol or a substituted furfuryl alcohol. A convenient method for preparing levulinic acid comprises treating cane sugar with concentrated hydrochloric acid at a temperature about 100° C. for a period of about 2 hours.

The alkaline catalyst is for the most part an inorganic basic alkali or alkaline earth metal compound and may be exemplified by sodium hydroxide, potassium hydroxide, barium oxide, calcium hydroxide, sodium methoxide, potassium ethoxide, potassium phenate, sodamide, sodium acetylacetonate, metallic sodium, metallic potassium, metallic barium, lithium butyl, and sodium naphthalenide. Metallic sodium is especially preferred because of its high catalytic activity in the process of this invention.

The following examples are illustrative of the process of this invention:

Example 1

To a mixture of 74 grams (0.57 mole) of methyl levulinate and 57 grams (0.52 mole) of dimethyl phosphite there is added 0.3 gram (0.01 mole) of sodium. An exothermic reaction occurs and the temperature rises spontaneously to 84° C. in 5 minutes. The reaction mixture is cooled to room temperature and methyl alcohol removed by distillation. The residue is heated to give a distillate of gamma-dimethylphosphono-gamma-valerolactone, boiling at 100°–120° C./0.03–0.4 mm. The lactone is redistilled at 118°–120° C./0.35 mm. and the redistilled product is found to have a phosphorus content of 15%, a saponification number of 793, and a maximum infrared absorption at 5.6 microns indicating a gamma-lactone structure.

Example 2

The procedure of Example 1 is repeated except that diethyl phosphite (69 grams) is used in lieu of the dimethyl phosphite and ethyl levulinate (72 grams) is used in lieu of the methyl levulinate. The redistilled product, i.e., gamma-diethylphosphono-gamma-valerolactone, is found to have a phosphorus content of 12.8% and a saponification number of 686.

Example 3

The procedure of Example 1 is repeated except that di-isopropyl phosphite (83 grams) is used in lieu of the dimethyl phosphite, 0.5 gram of sodium is used as the catalyst, and isopropyl levulinate (79) grams) is used in lieu of the ethyl levulinate. The redistilled gamma-diisopropylphosphono-gamma-valerolactone is found to have a phosphorus content of 10.9% and a saponification number of 684.

Example 4

To a mixture of 86 grams of isobutyl levulinate and 97 grams of di-isobutyl phosphite there is added 0.5 gram of sodium. The mixture is heated to 70° C. and thereafter is allowed to stand at room temperature overnight. Isobutyl alcohol is then removed from the reaction mixture by distillation. The residue is heated to give a distillate of gamma-diisobutylphosphono-gamma-valerolactone, boiling at 130° C./0.1–0.15 mm. The lactone is redistilled at 135°–141° C./0.3–0.4 mm. The redistilled product is found to have a phosphorus content of 10.4% and a saponification number of 531.

Example 5

To a mixture of 50 grams of methyl levulinate and 145 grams of di-n-butyl phosphite there is added 0.2 gram of sodium. The reaction is exothermic and the temperature rises spontaneously to 64° C. The reaction mixture is then dissolved in 250 cc. of benzene, washed with water, and dried by contact with anhydrous magnesium sulfate. Benzene is removed by distillation. The residue is heated to give a distillate of gamma-di-n-butylphosphono-gamma-valerolactone. The lactone is redistilled. The redistilled product is found to have a phosphorus content of 10.3% and a saponification number of 535.

Example 6

To a mixture of 86 grams of n-butyl levulinate and 153 grams of di-2-ethylhexyl phosphite there is added 0.5 gram of sodium. The resulting mixture is heated at 200° C. for 2 hours, diluted with 50 cc. of diethyl ether, washed with a saturated solution of sodium bicarbonate, and dried. The residue is heated to distill off n-butyl alcohol and other volatile contaminants and then heated to 180° C./0.7 mm. whereupon gamma-di-(2-ethylhexyl)-phosphono-gamma-valerolactone is collected as the distillate. The distillate is found to have a phosphorus content of 8% and a saponification number of 349.

Example 7

To an equimolar mixture of phenyl gamma-ketoheptanoate and diphenyl phosphite there is added 0.001 mole of sodium per mole of the phosphite. The resulting mixture is maintained at 80° C. in nitrogen atmosphere until the reaction is substantially complete. The mixture is heated to distill off phenol, and the residue is then heated in vacuum to give a distillate of gamma-diphenylphosphono-gamma-enantholactone.

Example 8

The procedure of Example 7 is repeated except ethyl levulinate is used in lieu of the phenyl gamma-ketoheptanoate and di-(p-tert-butylphenyl) phosphite is used in lieu of the diphenyl phosphite used. The product obtained by distillation is gamma-di-(p-tert-butylphenyl)-phosphono-gammavalerolactone.

Example 9

The procedure of Example 7 is repeated except that methyl levulinate is used in lieu of the phenyl gamma-ketoheptanoate and didodecyl phosphite is used in place of the diphenyl phosphite used. The product obtained is gamma-didodecyl-phosphono-gamma-valerolactone.

Example 10

To an equimolar mixture of butyl gamma-ketobutanoate and dibutyl phosphite there is added 0.002 mole of sodium per mole of the phosphite. The reaction mixture is allowed to stand at 25° C. for 3 hours. Thereafter it is heated to distill off butyl alcohol. The residue is then heated to give a distillate of gamma-dibutylphosphono-gamma-butyrolactone.

Example 11

To an equimolar mixture of methyl alpha-chloro-gamma-ketododecanoate and dicyclohexyl phosphite there is added 0.05 mole of sodium ethoxide per mole of the phosphite. The resulting mixture is heated at the reflux temperature until the reaction is substantially complete. Thereafter the mixture is heated to distill off methyl alcohol. The residue comprises essentially gamma-dicyclohexylphosphono-alpha-chloro-gamma-laurolactone.

Example 12

The procedure of Example 11 is repeated except that ethyl levulinate is used in lieu of the methyl alpha-chloro-gamma-ketododecanoate and di-(beta-phenylethyl) phosphite is used in lieu of the dicyclohexyl phosphite. The product is gamma - di - (beta - phenylethyl)-phosphono-gamma-valerolactone.

The lactones of this invention are useful for a variety of purposes. They are useful, for example, as insecticides, plasticizers, hydrocarbon oil additives, and intermediates for the preparation of other useful phosphorus-containing compositions. A specific illustration of the utility of the lactones is an improved motor fuel composition which comprises a gasoline having an octane number of 100 (one gallon) containing incorporated therein tetra-ethyl lead (3 cc.), ethylene dibromide (3 atoms of bromine per each atom of lead), and gamma-dimethylphosphono-gamma-valerolactone (0.3 atom of phosphorus per atom of lead). The lactone reduces the tendency of the fuel composition to undergo preignition. Another illustration of the utility of the lactones is an insecticidal composition which comprises 95 parts by weight of kerosene and 5 parts by weight of the product of Example 6. When applied as a spray on vegetation, e.g., spruce or pine, this composition is effective in controlling infestation of red spider mites.

What is claimed is:

1. A process for preparing gamma-phosphono-gamma-lactones which comprises reacting an organic phosphite selected from the class consisting of mono- and di-hydrocarbon substituted phosphites with a substantially hydrocarbon ester of a gamma-keto-substituted aliphatic carboxylic acid in the presence of a small amount of an alkaline catalyst selected from the class consisting of alkali and alkaline earth metal bases.

2. The process of claim 1 characterized further in that the phosphite is an alkyl phosphite.

3. The process of claim 1 characterized further in that the phosphite is an aryl phosphite.

4. The process of claim 1 characterized further in that the phosphite is a dialkyl phosphite.

5. The process of claim 1 characterized further in that the phosphite is a dialkyl phosphite wherein the alkyl radicals contain from 1 to about 30 carbon atoms.

6. The process of claim 1 characterized further in that the ester is an ester of levulinic acid.

7. The process of claim 1 characterized further in that the ester is an ester of a gamma-ketocarboxylic acid having from 4 to about 30 carbon atoms.

8. The process of claim 1 characterized further in that the alkaline catalyst is sodium.

No references cited.